United States Patent
Kim

(10) Patent No.: US 9,997,133 B2
(45) Date of Patent: Jun. 12, 2018

(54) IMAGE PROCESSING APPARATUS, IMAGE PROCESSING METHOD, AND COMPUTER-READABLE RECORDING MEDIUM

(71) Applicant: Samsung Electronics Co., Ltd., Gyeonggi-do (KR)

(72) Inventor: Su-hee Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/025,613

(22) PCT Filed: Sep. 4, 2014

(86) PCT No.: PCT/KR2014/008312
§ 371 (c)(1),
(2) Date: Mar. 29, 2016

(87) PCT Pub. No.: WO2015/102203
PCT Pub. Date: Jul. 9, 2015

(65) Prior Publication Data
US 2016/0240166 A1    Aug. 18, 2016

(30) Foreign Application Priority Data

Jan. 3, 2014 (KR) .................. 10-2014-0000841

(51) Int. Cl.
*G06K 9/34* (2006.01)
*G09G 5/02* (2006.01)
(Continued)

(52) U.S. Cl.
CPC .......... *G09G 5/026* (2013.01); *G09G 3/3208* (2013.01); *H04N 1/6058* (2013.01); *H04N 9/643* (2013.01);
(Continued)

(58) Field of Classification Search
CPC .. G09G 5/026; G09G 3/3208; G09G 2320/02; G09G 2340/06; G09G 2340/02; H04N 1/6058; H04N 9/643; H04N 9/67
(Continued)

(56) References Cited

U.S. PATENT DOCUMENTS 5,757,438 A    5/1998    Yoon et al.
6,570,584 B1    5/2003    Cok et al.
(Continued)

FOREIGN PATENT DOCUMENTS

CN    1119397 A    3/1996
CN    1537304 A    10/2004
(Continued)

OTHER PUBLICATIONS

Chinese Search Report, dated Jan. 17, 2017.
(Continued)

*Primary Examiner* — Sheela C Chawan
(74) *Attorney, Agent, or Firm* — Cha & Reiter, LLC

(57) ABSTRACT

An image processing method is provided. The image processing method includes: converting a color reproduction target of an input image according to a color gamut of a target display device; generating a file of the input image of which the color reproduction target is converted; and storing the file of the input image.

18 Claims, 12 Drawing Sheets

(51) Int. Cl.
*H04N 1/46* (2006.01)
*G03F 3/08* (2006.01)
*H04N 9/64* (2006.01)
*H04N 9/67* (2006.01)
*H04N 1/60* (2006.01)
*G09G 3/3208* (2016.01)

(52) U.S. Cl.
CPC ............ *H04N 9/67* (2013.01); *G09G 2320/02* (2013.01); *G09G 2340/02* (2013.01); *G09G 2340/06* (2013.01)

(58) Field of Classification Search
USPC .......... 382/164, 167; 345/600; 358/1.9, 518, 358/527, 471, 296, 501, 520, 529, 505; 348/739, 744, 750, 756, 757, 759, 760, 348/761
See application file for complete search history.

(56) References Cited

U.S. PATENT DOCUMENTS

| | | | |
|---|---|---|---|
| 6,769,772 B2 | 8/2004 | Roddy et al. | |
| 7,079,155 B2 | 7/2006 | Kanai | |
| 7,408,558 B2 | 8/2008 | Madden et al. | |
| 7,414,755 B2 * | 8/2008 | Ott-Heizmann | B41F 33/0045 358/1.9 |
| 7,436,996 B2 * | 10/2008 | Ben-Chorin | G09G 5/02 345/590 |
| 7,583,403 B2 * | 9/2009 | Ito | H04N 1/62 358/1.9 |
| 7,649,657 B2 * | 1/2010 | Kwak | G09G 5/02 345/600 |
| 7,852,533 B2 * | 12/2010 | Park | H04N 1/62 358/1.9 |
| 8,233,098 B2 | 7/2012 | Muijs et al. | |
| 8,463,067 B2 | 6/2013 | Kim et al. | |
| 8,581,925 B2 | 11/2013 | Lee et al. | |
| 9,185,268 B2 | 11/2015 | Doser et al. | |
| 9,406,148 B2 | 8/2016 | Zhu et al. | |
| 2006/0203004 A1 | 9/2006 | Hwang et al. | |
| 2007/0211074 A1 | 9/2007 | Yeung | |
| 2008/0137942 A1 * | 6/2008 | Hong | H04N 1/62 382/164 |
| 2008/0266315 A1 | 10/2008 | Im et al. | |
| 2009/0040573 A1 * | 2/2009 | Lee | G06T 11/001 358/505 |
| 2009/0273615 A1 | 11/2009 | Ohnishi | |
| 2010/0220237 A1 | 9/2010 | Doser et al. | |
| 2011/0115811 A1 | 5/2011 | Zhang et al. | |
| 2011/0249016 A1 | 10/2011 | Zhang et al. | |
| 2012/0076404 A1 * | 3/2012 | Bryant | G06T 5/009 382/167 |
| 2013/0335439 A1 | 12/2013 | Jeong et al. | |
| 2014/0253545 A1 | 9/2014 | Sullivan et al. | |

FOREIGN PATENT DOCUMENTS

| | | |
|---|---|---|
| CN | 1831930 A | 9/2006 |
| CN | 1934851 A | 3/2007 |
| CN | 100341045 C | 10/2007 |
| CN | 101248677 A | 8/2008 |
| CN | 101296383 A | 10/2008 |
| CN | 101616332 A | 12/2009 |
| CN | 101641949 A | 2/2010 |
| CN | 101916431 A | 12/2010 |
| CN | 101989413 A | 3/2011 |
| CN | 102044230 A | 5/2011 |
| CN | 102598114 A | 7/2012 |
| CN | 101198070 B | 4/2013 |
| CN | 103067661 A | 4/2013 |
| CN | 101543039 B | 8/2013 |
| EP | 0 611 231 A1 | 8/1994 |
| EP | 2 284 830 A1 | 2/2011 |
| WO | 2006/059282 A2 | 6/2006 |

OTHER PUBLICATIONS

European Search Report dated Aug. 11, 2017.
Chinese Search Report dated Sep. 6, 2017.
Chinese Search Report Dated Mar. 6, 2018.

* cited by examiner

FIG. 9

$$\begin{pmatrix} Y \\ Cb \\ Cr \end{pmatrix} = \overbrace{\begin{pmatrix} YCC_0 & YCC_1 & YCC_2 \\ YCC_3 & YCC_4 & YCC_5 \\ YCC_6 & YCC_7 & YCC_8 \end{pmatrix}}^{M1} * \overbrace{\begin{pmatrix} \text{Optimization} \\ \text{Matrix} \end{pmatrix}}^{M2} * \begin{pmatrix} R \\ G \\ B \end{pmatrix}$$

(RGB to YCbCr Color Space Conversion)

FIG. 10

$$\begin{pmatrix} R' \\ G' \\ B' \end{pmatrix} = \overbrace{\begin{pmatrix} YCC'_0 & YCC'_1 & YCC'_2 \\ YCC'_3 & YCC'_4 & YCC'_5 \\ YCC'_6 & YCC'_7 & YCC'_8 \end{pmatrix}}^{M3} * \begin{pmatrix} Y \\ Cb \\ Cr \end{pmatrix}$$

(Inverse Conversion)

IMAGE PROCESSING APPARATUS, IMAGE PROCESSING METHOD, AND COMPUTER-READABLE RECORDING MEDIUM

CLAIM OF PRIORITY

This application is a National Phase Entry of PCT International Application No. PCT/KR2014/008312, which was filed on Sep. 4, 2014, and claims a priority to Korean Patent Application No. 10-2014-0000841, which was filed on Jan. 3, 2014, the contents of which are incorporated herein by reference.

TECHNICAL FIELD

One or more embodiments of the present invention relate to an image processing apparatus, an image processing method, and a computer-readable recording medium.

BACKGROUND ART

Recently, various types of display devices, such as an organic light-emitting display device and a liquid crystal display device, have been provided. The organic light-emitting display device is capable of displaying an image in a wide color gamut and therefore, is receiving attention as a next-generation display device. Such a wide color gamut display device may represent colors brilliantly and deeply. In particular, the organic light-emitting display device may represent a deep sea color, a sky color, and a green color in rich color.

DETAILED DESCRIPTION OF THE INVENTION

Technical Problem

One or more embodiments of the present invention include an image processing method and an image processing apparatus, which use a wide color gamut of a wide color gamut-display device to generate an image file that improves the display quality of an image.

One or more embodiments of the present invention include an image processing method and an image processing apparatus, via which the quality of an image is maintained above a predetermined level even when the image is displayed on various display devices.

Technical Solution

Additional aspects will be set forth in part in the description which follows and, in part, will be apparent from the description, or may be learned by practice of the presented embodiments.

According to one or more embodiments of the present invention, an image processing method includes: converting a color reproduction target of an input image according to a color gamut of a target display device; generating a file of the input image of which the color reproduction target is converted; and storing the file of the input image.

The image processing method may further include displaying the input image of which the color reproduction target is converted.

The converting of the color reproduction target of the input image may include converting a saturation component of the input image.

The target display device may be an organic light-emitting display device.

The image processing method may further include converting a color space of the input image to a color space in which a brightness component and a chroma component are separable.

The image processing method may further include: detecting a skin color region having color components in a skin color range from the input image; and excluding the skin color region from objects to be processed for color reproduction target conversion.

The image processing method may further include: detecting a gray region having a saturation value that is equal to or smaller than a reference saturation from the input image; and excluding the gray region from objects to be processed for color reproduction target conversion.

The image processing method may further include: determining whether the input image is captured under a low illuminance condition; and adjusting color conversion intensity for a low illuminance-sensitive color region in which color distortion occurs under the low illuminance condition during conversion of the color reproduction target of the input image when the input image is captured under the low illuminance condition.

The color gamut of the target display device may be wider than a color gamut of the input image.

According to one or more embodiments of the present invention, an image processing apparatus includes: a color reproduction target converter that converts a color reproduction target of an input image according to a color gamut of a target display device; a file generator that generates a file of the input image of which the color reproduction target is converted; and a storage unit that stores the file of the input image.

The image processing apparatus may further include a display unit that displays the input image of which the color reproduction target is converted.

The color reproduction target converter may convert a saturation component of the input image.

The target display device may be an organic light-emitting display device.

The image processing apparatus may further include a color space converter that converts a color space of the input image to a color space in which a brightness component and a chroma component are separable.

The image processing apparatus may further include a skin color processor that detects a skin color region having color components in a skin color range from the input image and excludes the skin color region from objects to be processed for color reproduction target conversion.

The image processing apparatus may further include a gray processor that detects a gray region having a saturation value that is equal to or smaller than a reference saturation from the input image and excludes the gray region from objects to be processed for color reproduction target conversion.

The image processing apparatus may further include a low illuminance processor that determines whether the input image is captured under a low illuminance condition and, when the input image is captured under the low illuminance condition, adjusts color conversion intensity for a low illuminance-sensitive color region in which color distortion occurs under the low illuminance condition during conversion of the color reproduction target of the input image.

The color gamut of the target display device may be wider than a color gamut of the input image.

According to one or more embodiments of the present invention, a computer-readable recording medium storing computer program codes that, when read and executed by a processor, execute an image processing method, the image processing method includes: converting a color reproduction target of an input image according to a color gamut of a target display device; generating a file of the input image of which the color reproduction target is converted; and storing the file of the input image.

The image processing method may further include displaying the input image of which the color reproduction target is converted.

Advantageous Effects

According to the one or more of the above embodiments of the present invention, an image file that improves the display quality of an image may be generated by using a wide color gamut of a wide color gamut-display device.

In addition, according to the one or more of the above embodiments of the present invention, the quality of an image may be improved over a predetermined level such that the image is represented in rich colors even when the image is displayed on various display devices.

DESCRIPTION OF THE DRAWINGS

FIG. 9 is a diagram illustrating a process of converting an input image represented by an RGB color space to a YCbCr color space.

FIG. 10 is a diagram illustrating a process of converting color space to a form displayable on a display unit.

MODE OF THE INVENTION

Figure 1:
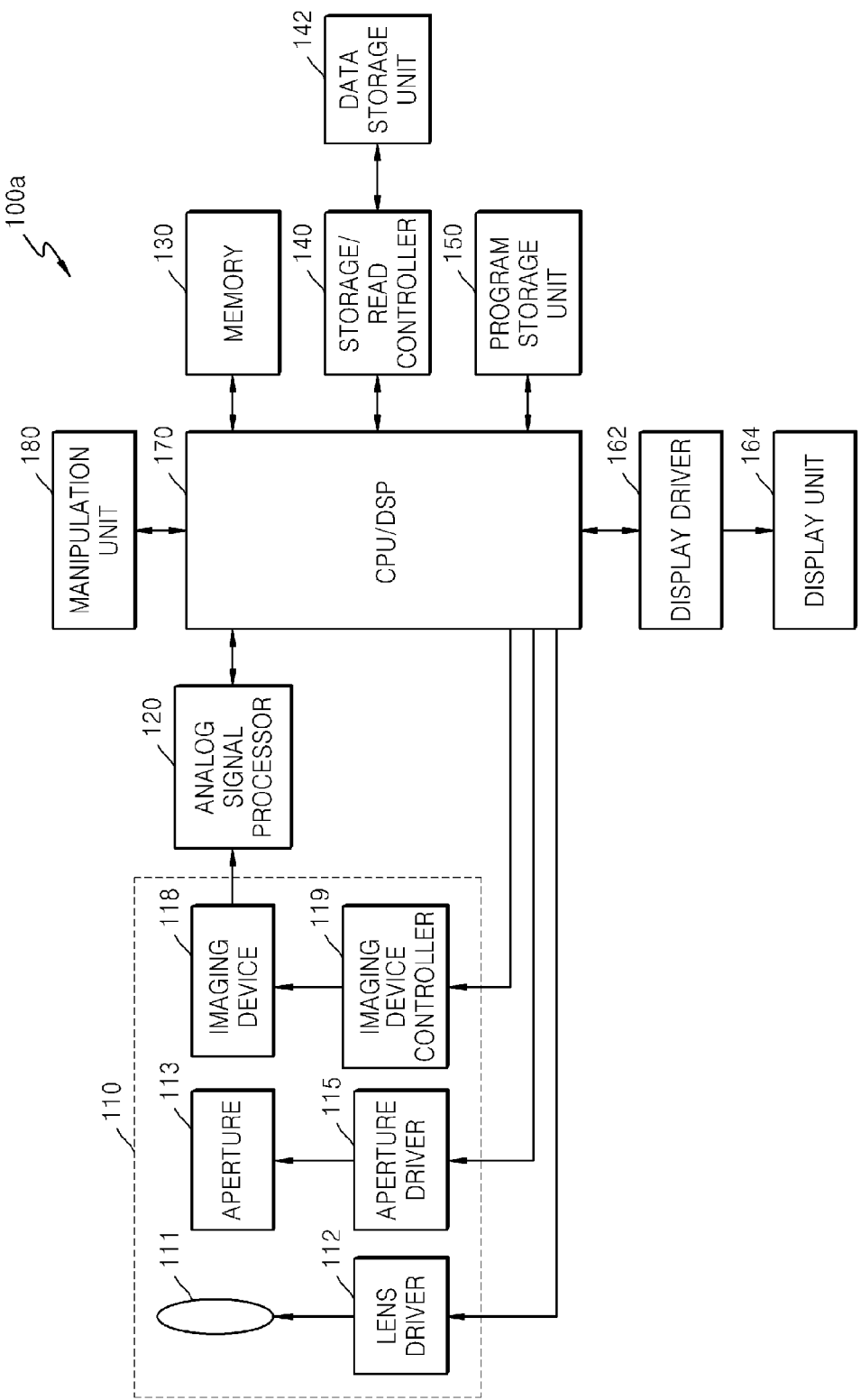
FIG. 1 is a block diagram of a configuration of an image processing apparatus according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

Terms used herein will be briefly described, and exemplary embodiments will be described in detail below.

As the terms used herein, so far as possible, widely-used general terms are selected in consideration of functions in the present invention; however, these terms may vary according to the intentions of those skilled in the art, the precedents, or the appearance of new technology. Also, in some cases, there may be terms that are optionally selected by the applicant, and the meanings thereof will be described in detail in the corresponding portions of the description of the embodiments of the present invention. Therefore, the terms used herein are not simple terms and should be defined based on the meanings thereof and the overall description of the embodiments of the present invention.

When it is described that one includes some elements, it should be understood that it may comprise (or include or has) only those elements, or it may comprise (or include or have) other elements as well as those elements if there is no specific limitation. As used herein, the term "unit" refers to a software component or a hardware component such as FPGA or ASIC, and the "unit" performs certain tasks. However, the "unit" should not be construed as being limited to software or hardware. The "unit" may be configured to reside on an addressable storage medium and be configured to execute one or more processors. Therefore, the "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and units or be further separated into additional components and "units".

Hereinafter, embodiments of the present invention will be described with reference to the accompanying drawings in such a manner that it may easily be carried out by a person with ordinary skill in the art to which the present invention pertains. For clarity of description, certain components not pertinent to the present invention are omitted.

FIG. 1 is a block diagram of a configuration of an image processing apparatus 100a according to an embodiment of the present invention.

The image processing apparatus 100a according to the embodiment of the present invention may include a photographing unit 110, an analog signal processor 120, a memory 130, a storage/read controller 140, a data storage unit 142, a program storage unit 150, a display driver 162, a display unit 164, a central processing unit/digital signal processor (CPU/DSP) 170, and a manipulation unit 180.

An overall operation of the image processing apparatus 100a is controlled by the CPU/DSP 170. The CPU/DSP 170 provides control signals to a lens driver 112, an aperture driver 115, and an imaging device controller 119 for operations of the lens driver 112, the aperture driver 115, and the imaging device controller 119.

The photographing unit 110, which is an element for generating an image of an electrical signal from incident light, includes a lens 111, the lens driver 112, an aperture 113, the aperture driver 115, an imaging device 118, and the imaging device controller 119.

The lens 111 may include a plurality of groups of lenses or a plurality of lenses. A position of the lens 111 is adjusted by the lens driver 112. The lens driver 112 adjusts a position of the lens 111 according to a control signal provided by the CPU/DSP 170.

An extent to which the aperture 113 is opened/closed is adjusted by the aperture driver 115, and the aperture 113 adjusts the amount of light incident on the imaging device 118.

An optical signal passing through the lens 111 and the aperture 113 reaches a light-receiving surface of the imaging device 118 to form an image of a subject. The imaging device 118 may be a charge-coupled device (CCD) image sensor or a complementary metal-oxide semiconductor image sensor (CIS), which converts the optical signal into an electrical signal. A sensitivity of the imaging device 118 may be adjusted by the imaging device controller 119. The imaging device controller 119 may control the imaging device 118 according to a control signal automatically generated by an image signal input in real time or a control signal manually input by a user's manipulation.

An exposure time of the imaging device 118 is adjusted by a shutter (not illustrated). The shutter may be a mechanical shutter that adjusts the incidence of light by moving the aperture 113, or an electronic shutter that adjusts exposure by applying an electrical signal to the imaging device 118.

The analog signal processor 120 performs noise reduction, gain adjustment, waveform shaping, analog-to-digital conversion, etc., on an analog signal provided from the imaging device 118.

The signal processed by the analog signal processor 120 may be input to the CPU/DSP 170 through the memory 130, or may be directly input to the CPU/DSP 170 without passing through the memory 130. The memory 130 functions as a main memory of the image processing apparatus 100a and temporarily stores necessary information during an operation of the CPU/DSP 170. The program storage unit 150 stores programs including an operation system, an application system, and so on, which drive the image processing apparatus 100a.

In addition, the image processing apparatus 100a includes the display unit 164 that displays information about an image captured by the image processing apparatus 100a or an operating state of the image processing apparatus 100a. The display unit 164 may provide visual information and/or acoustic information to the user. In order to provide the visual information, the display unit 164 may include, for example, a liquid crystal diode (LCD) display panel or an organic light-emitting diode (OLED) display panel. Alternatively, the display unit 164 may be a touchscreen that may receive a touch input.

The display driver 162 applies a driving signal to the display unit 164.

The CPU/DSP 170 processes an image signal input thereto and controls each element of the image processing apparatus 100a according to the image signal or an external input signal. The CPU/DSP 170 may perform image signal processing such as noise reduction, gamma correction, color filter array interpolation, color matrix, color correction, or color enhancement on input image data to improve image quality. Also, the CPU/DSP 170 may generate an image file by compressing image data generated by performing the image signal processing for improving image quality, or may restore image data from the image file. An image compression format may be reversible or irreversible. In the case of a still image, examples of the image compression format may include a joint photographic experts group (JPEG) format and a JPEG 2000 format. Also, in the case where a moving picture is recorded, a moving picture file may be generated by compressing a plurality of frames according to the moving picture experts group (MPEG) standard. The image file may be generated according to, for example, the exchangeable image file format (Exif) standard.

The image data output from the CPU/DSP 170 is input to the storage/read controller 140 directly or through the memory 130, and the storage/read controller 140 stores the image data in the data storage unit 142 automatically or according to a signal from the user. Also, the storage/read controller 140 may read data about an image from an image file stored in the data storage unit 142 and may input the data to the display driver 162 through the memory 130 or another path to display the image on the display unit 164. The data storage unit 142 may be detachably attached to the image processing apparatus 100a or may be permanently attached to the image processing apparatus 100a.

Also, the CPU/DSP 170 may perform color processing, blur processing, edge emphasis, image analysis, image recognition, image effect processing, and so on. Examples of the image recognition may include face recognition and scene recognition. In addition, the CPU/DSP 170 may perform display image signal processing for displaying the image on the display unit 164. For example, the CPU/DSP 170 may perform brightness level adjustment, color correction, contrast adjustment, contour emphasis, screen splitting, character image generation, and image synthesis. The CPU/DSP 170 may be connected to an external monitor, may perform predetermined image signal processing to display an image on the external monitor, and may transmit processed image data to display a relevant image on the external monitor.

Also, the CPU/DSP 170 may generate a control signal for controlling auto-focusing, zoom change, focus change, auto-exposure correction, and so on by executing a program stored in the program storage unit 150 or by including a separate module and may provide the control signal to the aperture driver 115, the lens driver 112, and the imaging device controller 119 to control operations of elements included in the image processing apparatus 100a such as a shutter and a strobe.

The manipulation unit 180 is an element through which the user may input a control signal. The manipulation unit 180 may include various functional buttons such as a shutter-release button for inputting a shutter-release signal by exposing the imaging device 118 to light for a predetermined period of time to take a photograph, a power button for inputting a control signal to control power on/off, a zoom button for widening or narrowing a viewing angle according to an input, a mode selection button, and a photographing setting value adjustment button. The manipulation unit 180 may be embodied as any forms that allow the user to input a control signal such as buttons, a keyboard, a touch pad, a touchscreen, and a remote controller.

The image processing apparatus 100a according to the embodiment described with reference to FIG. 1 is merely one embodiment of the present invention, and an image processing apparatus is not limited thereto. As obvious, embodiments of the present invention may be applicable to a camera, a camcorder, a personal digital assistant (PDA), a portable phone, and a computer, which process an input image and generate an image file. Although image processing apparatuses according to embodiments of the present invention are implemented in the form of a photographing apparatus shown in FIG. 1, embodiments of the present invention are not limited to the configuration illustrated in FIG. 1.

Figure 2:
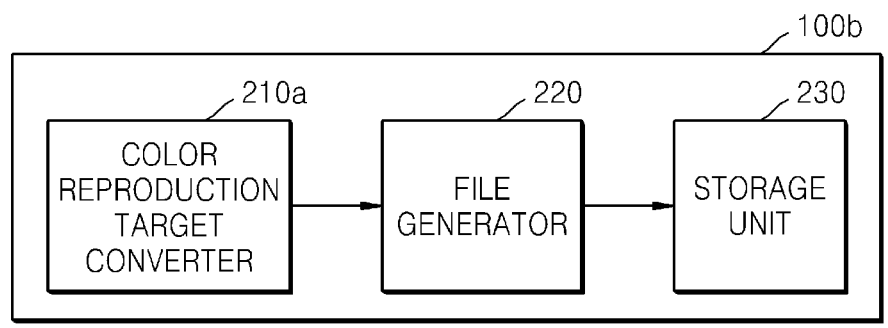
FIG. 2 is a diagram illustrating a configuration of an image processing apparatus 100b according to an embodiment of the present invention.

FIG. 2 is a diagram illustrating a configuration of an image processing apparatus 100b according to an embodiment of the present invention. The image processing apparatus 100b according to the embodiment of the present invention includes a color reproduction target converter 210a, a file generator 220, and a storage unit 230. According to an embodiment, the color reproduction target converter 210a and the file generator 220 may be included in the CPU/DSP 170 of the embodiment of FIG. 1, and the storage unit 230 may correspond to the data storage unit 142 of the embodiment of FIG. 1.

Figure 3:
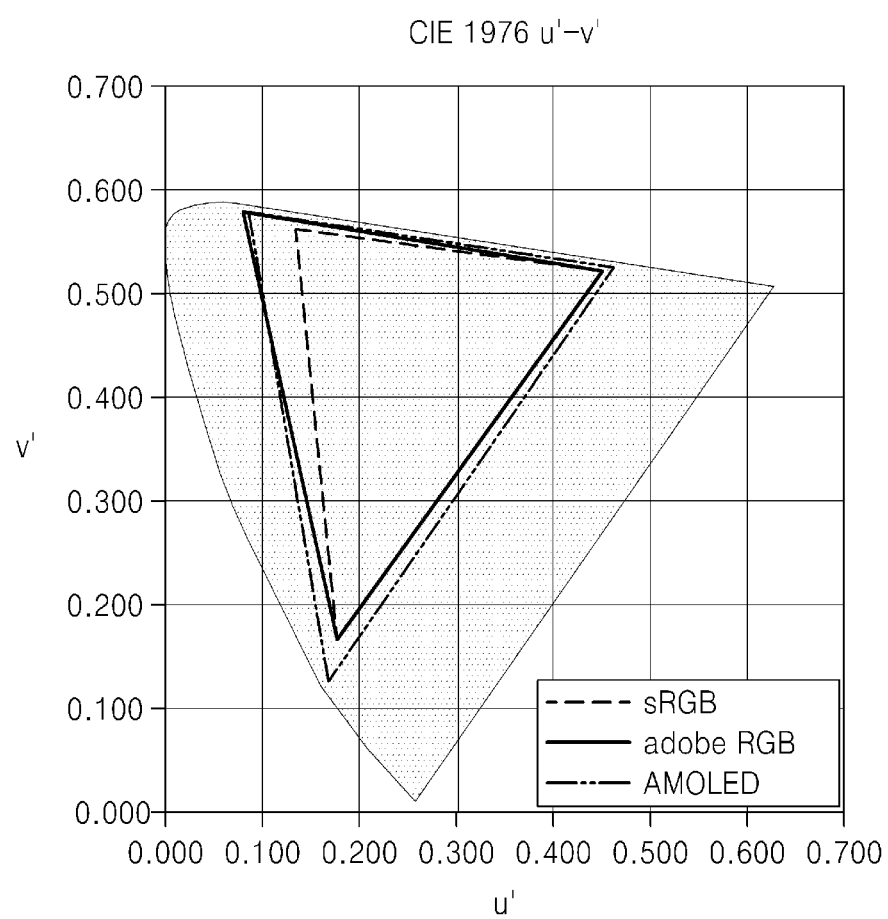
FIG. 3 is a diagram illustrating an sRGB color space, an adobe RGB color space, and a color gamut of an organic light-emitting display device.

FIG. 3 is a diagram illustrating an sRGB color space, an adobe RGB color space, and a color gamut of an organic light-emitting display device.

The color gamut refers to a certain complete subset of colors represented upon color production. When a color is represented in a given circumstance, such as within a given color space or by a certain output device, a relevant color space or a color gamut of the output device is determined. As illustrated in FIG. 3, the sRGB color space has a color gamut that is narrower than that of the organic light-emitting display device, and the adobe RGB color space has a color gamut that is wider than that of the sRGB color space, but does not entirely cover the color gamut of the organic light-emitting display device. On the other hand, a number of photographing devices may generate a captured image in the sRGB color space or the adobe RGB color space and generate a file of the captured image. When the image generated in the sRGB color space or the adobe RGB color space is displayed on the organic light-emitting display device, the wide color gamut of the organic light-emitting display device is not entirely used.

Figure 4:
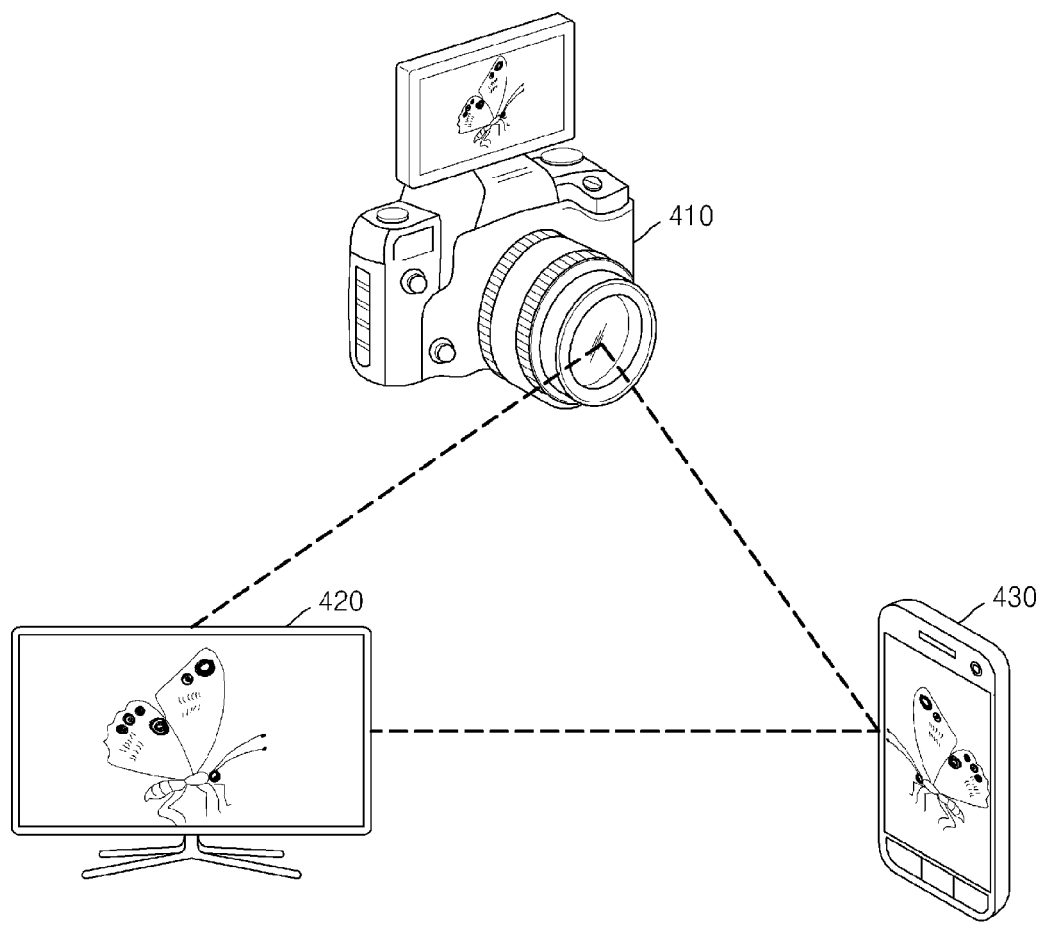
FIG. 4 is a diagram illustrating reproduction of image content in various electronic devices according to an embodiment of the present invention.

FIG. 4 is a diagram illustrating reproduction of image content in various electronic devices, according to an embodiment of the present invention.

Image content stored as an image file may be reproduced by various electronic devices, such as a camera 410, a television 420, and a smartphone 430, as illustrated in FIG. 4. When respective display devices of the electronic devices have different color gamuts, the image content is reproduced without color consistency between the electronic devices. Although the chroma of an image to be reproduced is converted according to a color gamut of a display device in each electronic device upon reproduction of an image file, color consistency between the electronic devices is hardly ensured with respect to the image content.

According to embodiments of the present invention, when the image processing apparatus 100a generates an image file, the image processing apparatus 100a converts a color reproduction target of an input image such that a color gamut of the input image is matched with a color gamut of a wide color gamut-display device and generates the image file.

The color reproduction target converter 210a (see FIG. 2) converts a color reproduction target of the input image according to a color gamut of a target display device.

Figure 5:
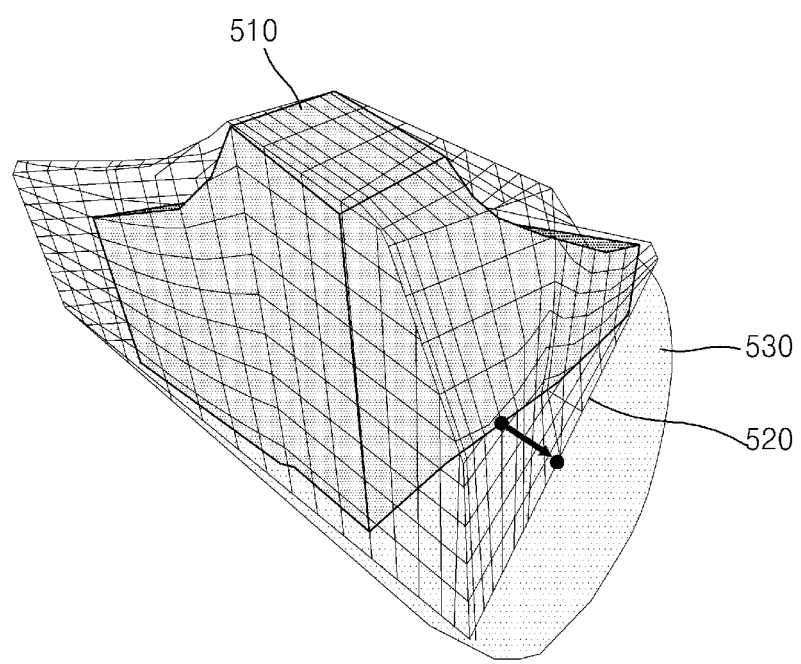
FIGS. 5 and 6 are diagrams illustrating a process of converting a color reproduction target of an input image, according to an embodiment of the present invention.
Figure 6:
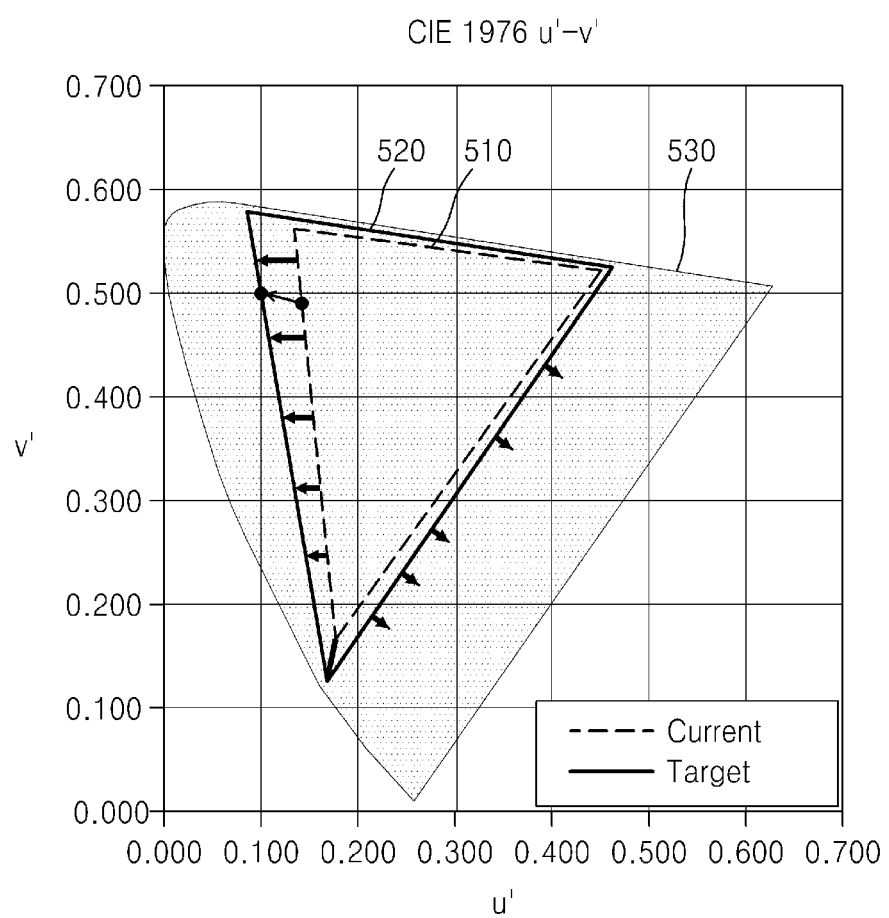

FIGS. 5 and 6 are diagrams illustrating a process of converting a color reproduction target of an input image, according to an embodiment of the present invention.

A color gamut 510 of an input image and a color gamut 520 of a target display device may be defined within a maximum color gamut 530, as illustrated in FIGS. 5 and 6. The color reproduction target converter 210a may define the color gamut 510 of the input image and the color gamut 520 of the target display device and convert a saturation of the input image, for each color, according to the color gamut 520 of the target display device. A degree of saturation conversion of each color may be determined by previously measuring a degree of emphasis of each color in, for example, the target display device.

According to an embodiment, when the color gamut 520 of the target display device is wider than the color gamut 510 of the input image, as illustrated in FIGS. 5 and 6, the color reproduction target converter 210a converts a saturation of each color of the input image, so as to expand the color gamut 510 of the input image according to the color gamut 520 of the target display device. According to the embodiment, the chroma of the input image is converted according to the color reproduction target, thereby allowing for reproduction of brilliant colors in the target display device.

For example, when the input image is represented by an sYCC color space and the target display device is an organic light-emitting display device, the input image may be converted according to the color gamut of the organic light-emitting display device, which is wider than that of the sYCC color space. In this case, the input image may be processed to increase a saturation of each pixel of the input image, so as to be represented within a color gamut that is wider than an existing color gamut. When the input image is displayed on the organic light-emitting display device, the wide color gamut of the organic light-emitting display device is selectively used, thus representing the input image with more stereoscopic and brilliant colors. When the input image is processed and is displayed on the organic light-emitting display device according to the embodiment, colors, such as a deep ocean blue, a sky royal blue, or a vivid green, may be represented to be more stereoscopic and brilliant than an existing color space, such as an sYCC color space or an adobe YCC color space. Therefore, according to the embodiments of the present invention, when an organic light-emitting display device is used, the wide color gamut of the organic light-emitting display device is entirely used, thus representing rich colors.

When the input image is displayed on a liquid crystal display device, of which the color gamut is narrower than that of the organic light-emitting display device, the liquid crystal display device converts the chroma of the input image according to a color gamut of the liquid crystal display device. For example, the liquid crystal display device may decrease a saturation of the input image with respect to a portion that is out of the color gamut of the liquid crystal display device such that the input image is represented within the color gamut of the liquid crystal display device. Although the input image is reproduced in a display device having a color gamut that is narrower that of a target display device, the input image is processed such that colors included in the color gamut of the liquid crystal display device are brilliantly displayed, resulting in reproduction of the input image with brilliant colors.

According to an embodiment, a process of converting the color reproduction target of an input image may be a process of converting a saturation value of each color. When the color gamut 510 of the input image is narrower than the color gamut 520 of the target display device, the color reproduction target converter 210a may increase a saturation value of each color. When the color gamut 510 of the input image is wider than the color gamut 520 of the target display device, the color reproduction target converter 210a may decrease a saturation value of each color.

According to an embodiment, the target display device may be an organic light-emitting display device employing an organic light-emitting diode (OLED).

The input image may be at least one of, for example, an imaging signal output from the imaging device 118, a live view image, and a reproduction image reproduced by decoding an image file.

The file generator 220 may generate a file of the input image, of which the color reproduction target is converted by the color reproduction target converter 210a. The file generator 220 may convert the input image, of which the color reproduction target is converted, to, for example, a joint photographic experts group (JPEG), portable network graphics (PNG), graphics interchange format (GIF), or moving picture experts group (MPEG) format. The file generator 220 may generate the image file according to, for example, an exchangeable image file format (Exif) format.

According to an embodiment of the present invention, the file generator 220 may store at least one selected from the group consisting of or a combination of information about a color space of the input image, information about the target display device, and information about a color space of the target display device in the image file along with the input image.

The storage unit 230 stores the image file. The storage unit 230 may be implemented by a nonvolatile memory, for example, a secure digital (SD) card or a flash memory. According to an embodiment, the storage unit 230 may be detachably installed in the image processing device 100b.

Figure 7:
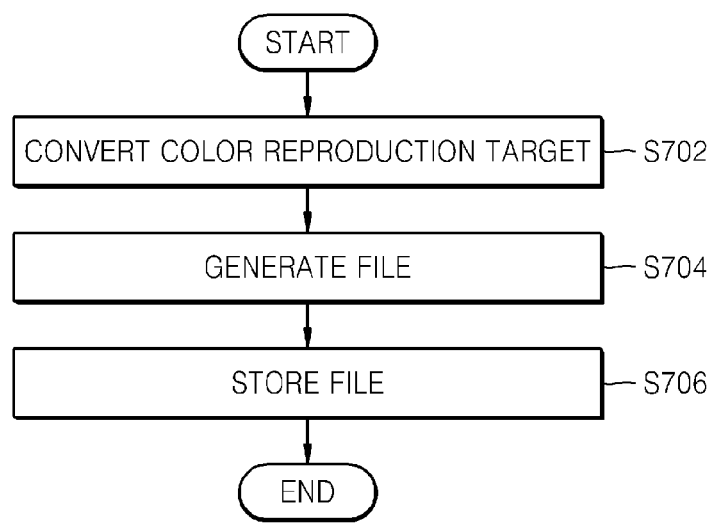
FIG. 7 is a flowchart of an image processing method according to an embodiment of the present invention.

FIG. 7 is a flowchart of an image processing method according to an embodiment of the present invention.

When an input image is input, the image processing method according to the embodiment converts a color reproduction target of the input image in consideration of a color gamut of a target display device (S702). For example, a saturation value of each color of the input image may be increase or decrease according to the color gamut of the target display device.

The image processing method generates a file of the input image, of which the color reproduction target is converted (S704).

The image processing method stores the file of the input image (S706).

Figure 8:
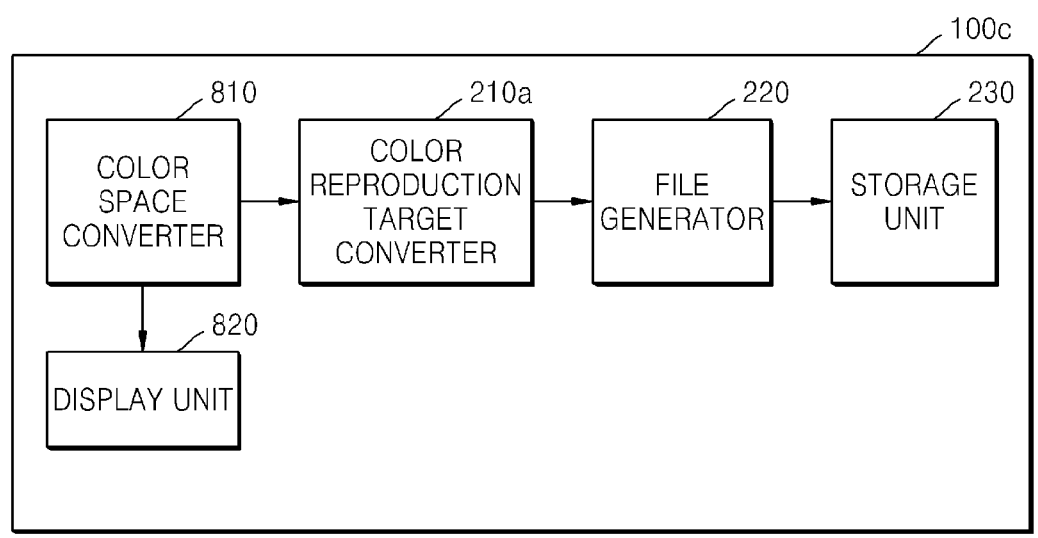
FIG. 8 is a diagram illustrating a configuration of an image processing apparatus according to another embodiment of the present invention.

FIG. 8 is a diagram illustrating a configuration of an image processing apparatus 100c according to another embodiment of the present invention. The image processing apparatus 100c according to the embodiment includes a color space converter 810, a display unit 820, a color reproduction target converter 210a, a file generator 220, and a storage unit 230.

The color space converter 810, the color reproduction target converter 210a, and the file generator 220 may be implemented in the CPU/DSP 170 of the embodiment of the FIG. 1. The display unit 820 may correspond to the display unit 164 of the embodiment of FIG. 1 and the storage unit 230 may correspond to the data storage unit 142 of the embodiment of FIG. 1.

The color space converter 810 converts a color space of the input image to a color space in which a brightness component and a chroma component are separable from the input image. For example, the input image is represented by a color space, such as an sRGB color space or an adobe RGB color space, the color space converter 810 converts the color space of the input image to a color space, such as a hue saturation value (HSV) color space or a YCbCr color space.

FIG. 9 is a diagram illustrating a process of converting an input image represented by an RGB color space to a YCbCr color space.

According to an embodiment, the color space converter 810 may convert the color space of the input image by performing convolution between pixel coordinate values of the input image in the RGB color space and a matrix M1 for color space conversion.

When the color gamut of the input image is represented by a color space in which a brightness component and a chroma component are not separable, such as an sRGB color space or an adobe RGB color space, it may be difficult to convert a color reproduction target by increasing or decreasing a value of the saturation component of each color. According to the embodiment, a color space of the input image is converted to a color space in which a brightness component and a chroma component are separable, making it easy to convert only a value of the saturation component of each color component in the input image.

The color reproduction target converter 210a converts a color reproduction target of the input image according to a color gamut of a target display device. According to the embodiment, the color reproduction target converter 210a may convert the color reproduction target of the input image, of which the color space is converted by the color space converter 810. When the input image is converted to an HSV color space, the color reproduction target converter 210a may convert a saturation value (value S). When the input image is converted to a YCbCr color space, the color reproduction target converter 210a may convert a Cb value or a Cr value.

According to an embodiment, the color reproduction target converter 210a may convert the color reproduction target of the input image by performing convolution between pixel values of the input image and a matrix M2 for color reproduction target conversion, as illustrated in FIG. 9, in addition to the matrix M1 for color space conversion.

The file generator 220 generates a file of the input image, of which the color reproduction target is converted by the color reproduction target converter 210a. The file generator 220 may convert the input image, of which the color reproduction target is converted, to, for example, a JPEG, PNG, GIF, or MPEG format. In addition, the file generator 220 may generate an image file according to, for example, an ExiF format.

The storage unit 230 stores the image file.

The color space converter 810 may convert the color space of the input image, of which the color reproduction target is converted by the color reproduction target converter 210a, to a color space that is displayable on the display unit 820 and output the input image to the display unit 820. For example, the color space converter 810 may convert a YCbCr color space of the input image which is output from the color reproduction target converter 210*a* to an adobe RGB color space and output the input image to the display unit 820.

FIG. 10 is a diagram illustrating a process of converting a color space to a form displayable on a display unit 820.

When the display unit 820 is capable of displaying an image of an RGB color space, as illustrated in FIG. 10, the color space converter 810 may inverse-convert a YCbCr image, of which the color gamut is converted, to an RGB image. In this case, the color space converter 810 performs convolution between a YCbCr value of each pixel and an inverse-conversion matrix M3 to obtain an RGB coordinate value, of which the color reproduction target is converted.

The display unit 820 displays the input image of which the color reproduction target is converted. The display unit 820 may be, for example, an organic light-emitting display device.

Figure 11:
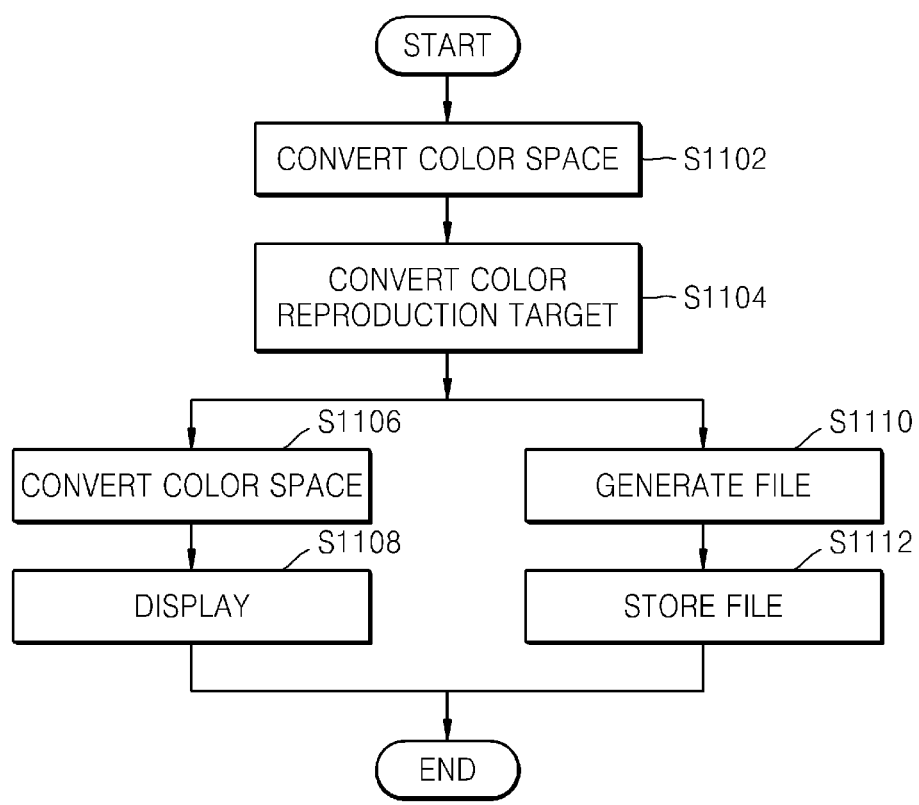
FIG. 11 is a flowchart of an image processing method according to another embodiment of the present invention.

FIG. 11 is a flowchart of an image processing method according to another embodiment of the present invention.

In the image processing method according to the embodiment, a color space of an input image is converted to a color space in which a brightness component and a chroma component are separable from the input image (S1102). The color space, in which the brightness component and the chroma component are separable, may be, for example, an HSV color space or a YCbCr color space.

The image processing method converts the chroma of the input image according to a color gamut of a target display device (S1104). For example, the image processing method may increase or decrease a saturation value of each color of the input image according to the color gamut of the target display device.

The image processing method generates a file of the input image, of which the color reproduction target is converted (S1110) and stores the file of the input image (S1112).

The image processing method converts the color space of the input image, of which the color reproduction target is converted, to a color space that is displayable on a display device (S1106) and displays the input image on the display device (S1108).

Figure 12:
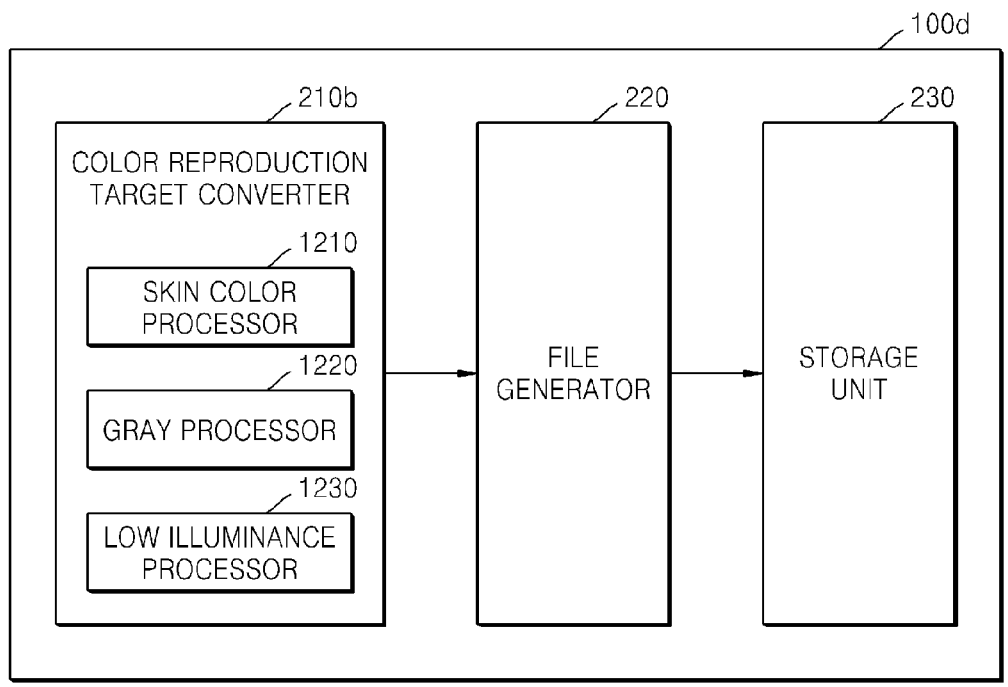
FIG. 12 is a diagram illustrating a configuration of an image processing apparatus according to another embodiment of the present invention.

FIG. 12 is a diagram illustrating a configuration of an image processing apparatus 100*d* according to another embodiment of the present invention. The image processing apparatus 100*d* according to the embodiment includes a color reproduction target converter 210*b*, a file generator 220, and a storage unit 230.

The color reproduction target converter 210*b* converts a color reproduction target of the input image according to a color gamut of a target display device. The color reproduction target converter 210*b* according to the embodiment may include a skin color processor 1210, a gray processor 1220, and a low illuminance processor 1230.

The skin color processor 1210 detects a skin color region having color components in a skin color range from the input image and excludes the skin color region from objects to be processed for color reproduction target conversion. The skin color region may be defined by pixels having colors in the skin color range.

Figure 13:
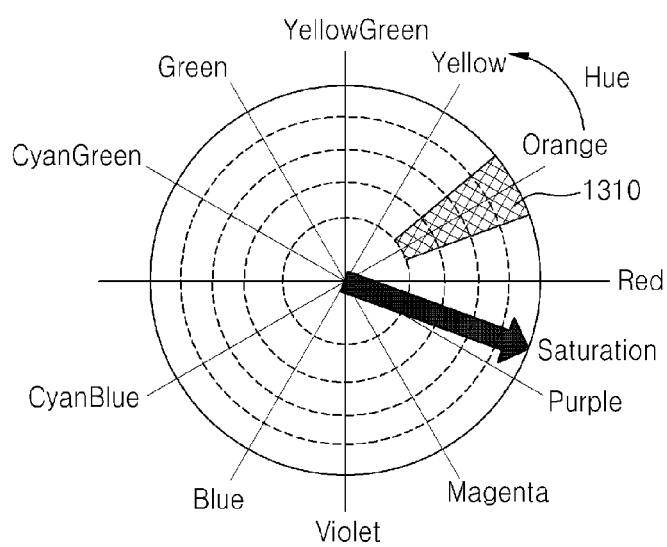
FIG. 13 is a diagram illustrating a skin color range according to an embodiment of the present invention.

FIG. 13 is a diagram illustrating a skin color range 1310 according to an embodiment of the present invention.

The skin color range 1310 may be defined by colors around an orange color as illustrated in FIG. 13. The skin color range 1310 may be defined from a color range around the orange color, except for a gray region with a low saturation. When a color value of each pixel of the input image falls within the skin color range 1310, the skin color processor 1210 may define the pixel as the skin color range.

According to an embodiment, the skin color processor 1210 may detect a face region from the input image and detect a skin color region from the face region.

When the skin color region is defined, the skin color processor 210 excludes the skin color region from objects to be processed for color reproduction target conversion. That is, the color reproduction target conversion is not performed on pixels in the skin color region and performed on pixels that are out of the skin color region.

It is necessary to naturally process the skin color region, compared to other regions. When saturation conversion is performed to convert a color reproduction target, an unnatural skin color may be represented. According to the embodiment, the color reproduction target conversion is not performed on the skin color region, thus maintaining a natural skin color.

Figure 14:
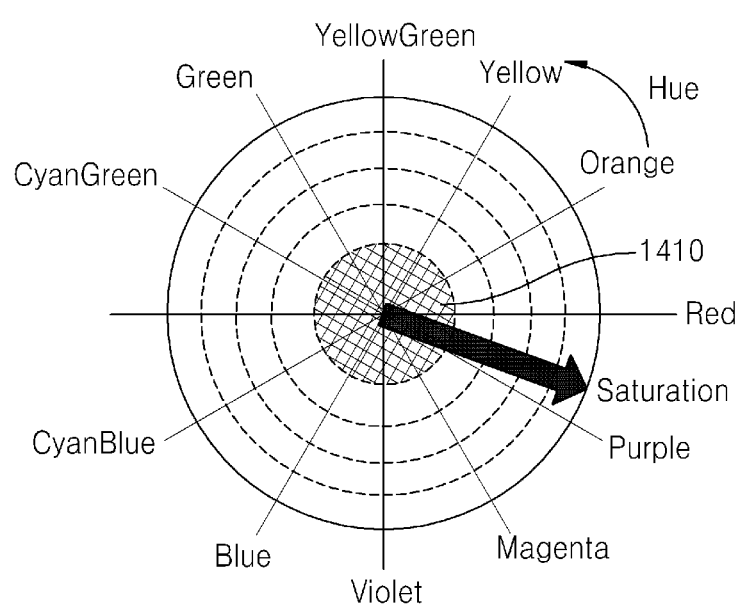
FIG. 14 is a diagram illustrating a gray color range according to an embodiment of the present invention.

The gray processor 1220 detects a gray region having a saturation value that is equal to or smaller than a reference saturation from the input image and excludes the gray region from objects to be processed for color reproduction target conversion. FIG. 14 is a diagram illustrating a gray color range 1410 according to an embodiment of the present invention.

The gray color range 1410 may be defined as a region having a saturation value that is equal to or smaller than a reference saturation. In a case where a pixel of an input image has a gray color, when a saturation value of the pixel is increased, a change is made such that a specific color is represented from a gray group, causing color distortion in the input image. According to the embodiment, color reproduction target conversion is not performed on pixels in the gray color range 1410 having a saturation value that is equal to or smaller than the reference saturation, preventing color distortion.

The low illuminance processor 1230 determines whether the input image is captured under a low illuminance condition. When the input image is captured under the low illuminance condition, the low illuminance processor 1230 adjusts color conversion intensity for a low illuminance-sensitive color region, in which color distortion occurs under the low illuminance condition. According to an embodiment, the low illuminance-sensitive color region may be a blue region. According to an embodiment, when a color gamut of a target display device is wider than a color gamut of the input image, adjusting the color conversion intensity refers to decreasing an increasing degree of saturation values of pixels having colors in the low illuminance-sensitive color region. According to another embodiment, when a color gamut of a target display device is narrower than the color gamut of the input image, adjusting the color conversion intensity refers to decreasing an emphasizing degree of the saturation values of pixels having colors in the low illuminance-sensitive color region when a process of increasing a saturation is performed on pixels in a region where the two color gamuts overlap each other, that is, in a representable color gamut. When photographing is performed under a low illuminance condition, colors in a specific region are likely to be represented as being emphasized, compared to a non-low illuminance condition. For example, the colors in the specific region are colors in the blue region. According to the embodiment, the color conversion intensity for the blue region is adjusted with respect to the input image captured under the low illuminance condition, thus correcting the color distortion of the input image captured under the low illuminance condition.

Information about whether the input image is captured under the low illuminance condition may be known by using an illuminance sensor provided in the image processing apparatus 100d. As another example, information about whether the input image is captured under the low illuminance condition may be known by using a color histogram of the input image. According to an embodiment, it may be determined whether the input image is captured under the low illuminance condition by calculating a light value (LV) using auto exposure (AE) information and determining an illuminance state.

The color reproduction target converter 210b may include all or at least one selected from the group consisting of the skin color processor 1210, the gray processor 1220, and the low illuminance processor 1230 depending on embodiments.

The file generator 220 may generate a file of the input image, of which the color reproduction target is converted by the color reproduction target converter 210a. The file generator 220 may convert the input image, of which the low illuminance-sensitive color region is converted, to, for example, a JPEG, PNG, GIF, or MPEG format. The file generator 220 may generate the image file according to, for example, an Exif format.

The storage unit 230 stores the image file.

Figure 15:
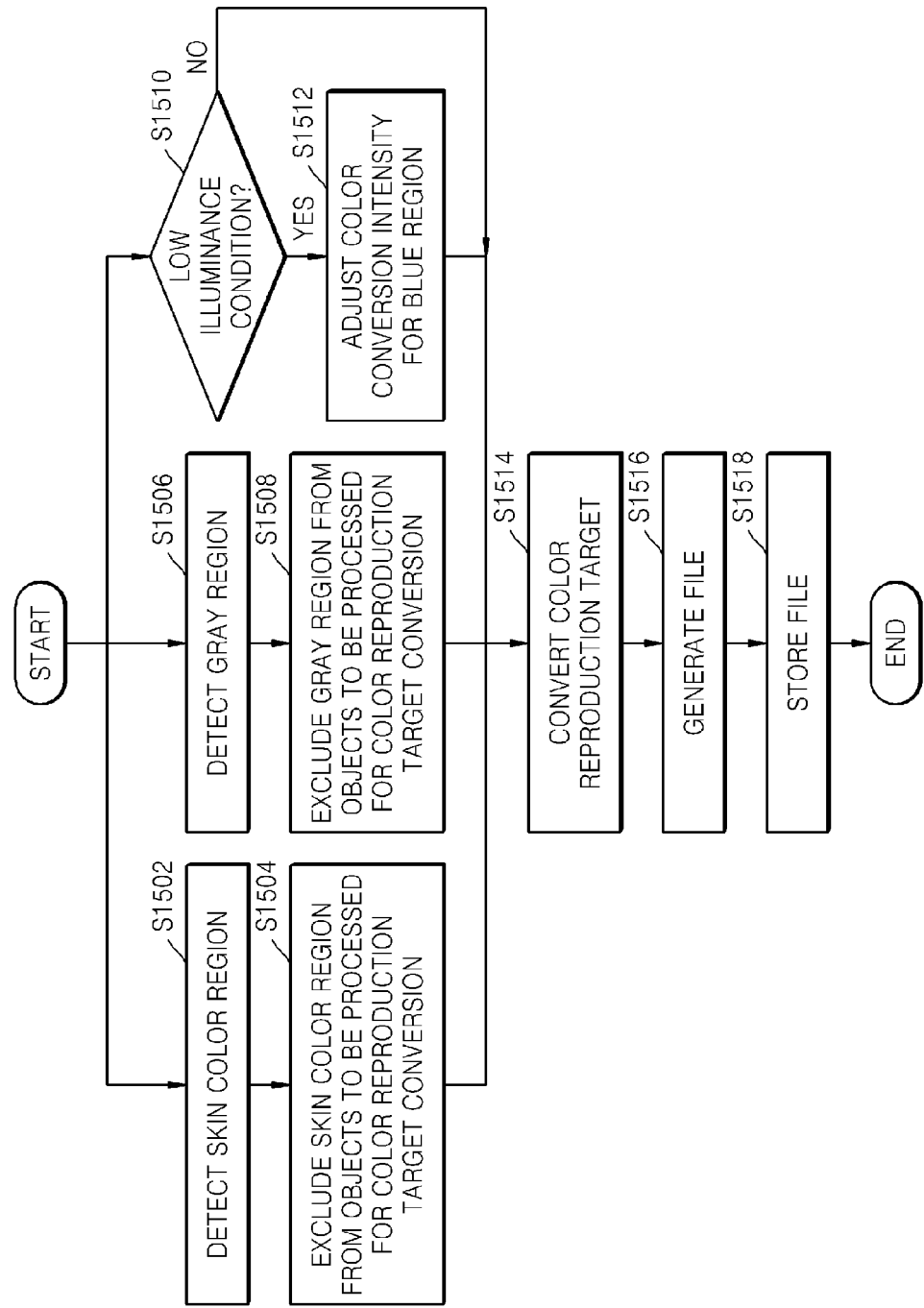
FIG. 15 is a flowchart of an image processing method according to another embodiment of the present invention.

FIG. 15 is a flowchart of an image processing method according to another embodiment of the present invention.

The image processing method according to the embodiment detects a skin color region having a skin color range from an input image (S1502). The image processing method excludes the skin color region from objects to be processed for color reproduction target conversion (S1504).

The image processing method detects a gray region having a saturation value that is equal to or smaller than a reference saturation from the input image (S1506) and excludes the gray region from objects to be processed for color reproduction target conversion (S1508).

The image processing method determines whether the input image is captured under a low illuminance condition (S1510). When the input image is captured under the low illuminance condition, the image processing method adjusts color conversion intensity for a low illuminance-sensitive color region (S1512).

Depending on embodiments, the image processing method may include all or at least one selected from the group consisting of the processing (S1502 and S1504) of the skin color region, the processing (S1506 and S1508) of the gray region, and the processing (S1510 and S1512) under the low illuminance condition. The processing (S1502 and S1504) of the skin color region, the processing (S1506 and S1508) of the gray region, and the processing (S1510 and S1512) under the low illuminance condition may be performed in parallel or in sequence.

Thereafter, the image processing method according to the embodiment converts a color reproduction target of the input image according to a color gamut of a target display device (S1514). For example, a saturation value of each color of the input image may be increased or decreased according to the color gamut of the target display device.

The image processing method generates a file of the input image, of which the color reproduction target is converted (S1516).

The image processing method stores the file of the input image (S1518).

Figure 16:
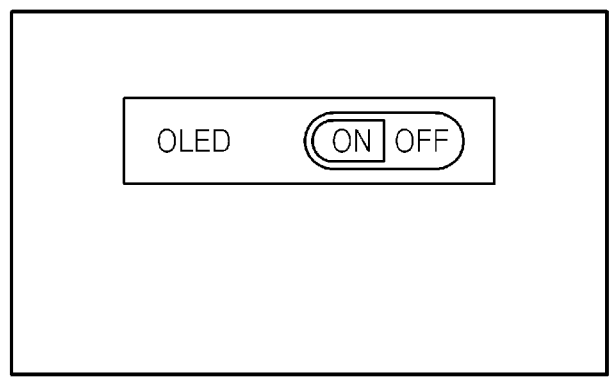
FIG. 16 is a diagram illustrating a user interface which allows a user to select whether to perform color reproduction target conversion, according to an embodiment of the present invention.

FIG. 16 is a diagram illustrating a user interface which allows a user to select whether to perform color reproduction target conversion, according to an embodiment of the present invention.

According to the embodiment, the user may select whether to perform color reproduction target conversion. The image processing apparatuses 100a, 100b, 100c, and 100d according to the embodiments of the present invention may perform or may not perform color reproduction target conversion according to a users selection.

The invention may be embodied as computer-readable codes on a computer-readable recording medium. The computer-readable recording medium is any data storage device that stores data which may be thereafter read by a computer system.

The computer-readable codes are configured to perform operations that implement the image processing methods according to the embodiments of the present invention when read from the computer-readable recording medium and executed by a processor. The computer-readable codes may be implemented by using various programming languages. Also, functional programs, codes, and code segments for accomplishing the present invention can be construed by programmers of ordinary skill in the art to which the present invention pertains.

Examples of the computer-readable recording medium include ROMs, RAMs, CD-ROMs, magnetic tapes, floppy disks, and optical data storage devices. The computer-readable recording medium can also be distributed over network-coupled computer systems so that the computer-readable code is stored and executed in a distributed fashion.

It should be understood that the exemplary embodiments described therein should be considered in a descriptive sense only and not for purposes of limitation. Descriptions of features or aspects within each embodiment should typically be considered as available for other similar features or aspects in other embodiments. While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. An image processing method comprising:
converting a color reproduction target of an input image with an input color gamut according to a color gamut of a target display device, wherein the input color gamut is different from the color gamut of the target display device;
generating a file of the input image according to the color gamut of the target display device; and
storing the file of the input image,
wherein converting comprises,
detecting a skin color region having color components in a skin color range from the input image; and
excluding the skin color region from objects to be processed for color reproduction target conversion.

2. The image processing method of claim 1, further comprising displaying the input image of which the color reproduction target is converted.

3. The image processing method of claim 1, wherein the converting of the color reproduction target of the input image comprises converting a saturation component of each color of the input color gamut.

4. The image processing method of claim 1, wherein the target display device is an organic light-emitting display device.

5. The image processing method of claim 1, further comprising converting a color space of the input image to a color space in which a brightness component and a chroma component are separable.

6. An image processing method comprising:
converting a color reproduction target of an input image with an input color gamut according to a color gamut of a target display device, wherein the input color gamut is different from the color gamut of the target display device;
generating a file of the input image according to the color gamut of the target display device;
storing the file of the input image,
wherein converting comprises,
detecting a gray region having a saturation value that is equal to or smaller than a reference saturation from the input image; and
excluding the gray region from objects to be processed for color reproduction target conversion.

7. An image processing method comprising:
converting a color reproduction target of an input image with an input color gamut according to a color gamut of a target display device, wherein the input color gamut is different from the color gamut of the target display device;
generating a file of the input image according to the color gamut of the target display device;
storing the file of the input image,
wherein converting comprises,
determining whether the input image is captured under a low illuminance condition; and
adjusting color conversion intensity for a low illuminance-sensitive color region in which color distortion occurs under the low illuminance condition during conversion of the color reproduction target of the input image when the input image is captured under the low illuminance condition.

8. The image processing method of claim 1, wherein the color gamut of the target display device is wider than the input color gamut and wherein converting the converting of the color reproduction target of the input image comprises increasing the saturation of each pixel of the input image.

9. An image processing apparatus comprising:
a color reproduction target converter that converts a color reproduction target of an input image with an input color gamut according to a color gamut of a target display device, wherein the input color gamut is different from the color gamut of the target display device;
a file generator that generates a file of the input image according to the color gamut of the target display device;
a memory that stores the file of the input image; and
a skin color processor that detects a skin color region having color components in a skin color range from the input image and excludes the skin color region from objects to be processed for color reproduction target conversion.

10. The image processing apparatus of claim 9, further comprising a display unit that displays the input image of which the color reproduction target is converted.

11. The image processing apparatus of claim 9, wherein the color reproduction target converter converts a saturation component of each color of the input color gamut.

12. The image processing apparatus of claim 9, wherein the target display device is an organic light-emitting display device.

13. The image processing apparatus of claim 9, further comprising a color space converter that converts a color space of the input image to a color space in which a brightness component and a chroma component are separable.

14. The image processing apparatus of claim 9, wherein the color gamut of the target display device is wider than a color gamut of the input image.

15. An image processing apparatus comprising:
a color reproduction target converter that converts a color reproduction target of an input image with an input color gamut according to a color gamut of a target display device, wherein the input color gamut is different from the color gamut of the target display device;
a file generator that generates a file of the input image according to the color gamut of the target display device;
a memory that stores the file of the input image; and
a gray processor that detects a gray region having a saturation value that is equal to or smaller than a reference saturation from the input image and excludes the gray region from objects to be processed for color reproduction target conversion.

16. An image processing apparatus comprising:
a color reproduction target converter that converts a color reproduction target of an input image with an input color gamut according to a color gamut of a target display device, wherein the input color gamut is different from the color gamut of the target display device;
a file generator that generates a file of the input image according to the color gamut of the target display device;
a memory that stores the file of the input image; and
a low illuminance processor that determines whether the input image is captured under a low illuminance condition and, when the input image is captured under the low illuminance condition, adjusts color conversion intensity for a low illuminance-sensitive color region in which color distortion occurs under the low illuminance condition during conversion of the color reproduction target of the input image.

17. A non-transitory computer-readable recording medium storing computer program codes that, when read and executed by a processor, execute an image processing method comprising:
converting a color reproduction target of an input image with an input color gamut according to a color gamut of a target display device, wherein the input color gamut is different from the color gamut of the target display device;
generating a file of the input image according to the color gamut of the target display device; and
storing the file of the input image,
wherein converting comprises,
detecting a skin color region having color components in a skin color range from the input image; and
excluding the skin color region from objects to be processed for color reproduction target conversion.

18. The non-transitory computer-readable recording medium of claim 17, wherein the image processing method further comprises displaying the input image of which the color reproduction target is converted.

* * * * *